US006248850B1

(12) United States Patent
Arai

(10) Patent No.: US 6,248,850 B1
(45) Date of Patent: Jun. 19, 2001

(54) FILM AND STRETCH PACKAGING FILM

(75) Inventor: Toru Arai, Machida (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/163,603

(22) Filed: Sep. 30, 1998

(30) Foreign Application Priority Data

Oct. 1, 1997 (JP) .................................................. 9-268402

(51) Int. Cl.[7] .................................................. C08F 212/08
(52) U.S. Cl. .......................... 526/347; 526/160; 526/943; 428/523
(58) Field of Search ..................... 428/327, 523; 526/160, 347, 348.1, 943, 127, 347.1

(56) References Cited

U.S. PATENT DOCUMENTS 5,543,484 * 8/1996 Chung et al. ..................... 526/347.1
5,652,315 * 7/1997 Inoue et al. ........................... 526/153
5,883,213 * 3/1999 Arai et al. ............................. 526/347

FOREIGN PATENT DOCUMENTS 94 00500    1/1994   (WO) .
95 32095    11/1995  (WO) .

OTHER PUBLICATIONS

Database WPI, Section Ch, Week 198923, Derwent Publication Ltd., London, GB; Class A18, AN 1989–170557 XP002131740 & JP 01 113447 A (Nippon Petrochemicals Co Ltd), May 2, 1989 *abstract*.

* cited by examiner

*Primary Examiner*—David W. Wu
*Assistant Examiner*—R. Harlan
(74) *Attorney, Agent, or Firm*—Oblon, Spivak, McClelland, Maier & Neustadt, P.C.

(57) ABSTRACT

A film containing at least 5 wt % of an aromatic vinyl compound-α-olefin random copolymer having an aromatic vinyl compound content of from 1 to less than 99.9% by molar fraction and having head-to-tail chain structure comprising at least two aromatic vinyl compound units.

16 Claims, 2 Drawing Sheets

FILM AND STRETCH PACKAGING FILM

The present invention relates to a film containing an aromatic vinyl compound-α-olefin random copolymer of a uniform composition having an aromatic vinyl compound content of from 1 to less than 99.9% by molar fraction and having head-to-tail chain structures comprising at least two aromatic vinyl compound units. Further, the present invention relates to a film containing an aromatic vinyl compound-ethylene random copolymer wherein the alternating structure of the aromatic vinyl compound and ethylene is in a predetermined proportion and the alternating structure is highly isotactic, and to a strength packaging film.

More particularly, the film of the present invention is preferably transparent and may have an optional physical property ranging from elastic to plastic and may have stretchability or shrinkability, by changing the content of the aromatic vinyl compound. Especially, the stretch packaging film is excellent in the self-adhesive property, mechanical strength such as tear propagation resistance, puncture resistance, breaking strength or elongation at break, elastic recovery, transparency, stretchability, tying property and oil resistance, and is thus suitable for use for stretch packaging.

Films employing so-called pseudo random styrene-ethylene copolymers having no head-to-tail styrene chain and no stereoregularity derived from styrene units, are known.

For example, U.S. Pat. No. 5,703,187 discloses a pseudo random copolymer (or interpolymer) obtained by using a so-called CGCT catalyst, and a film employing it.

WO95/32095 discloses a (multi-layered) shrinkable film employing a pseudo random copolymer obtained by using a similar CGCT catalyst.

However, these pseudo random copolymers are not fully satisfactory with respect to the mechanical properties such as breaking strength, or the chemical resistance such as solvent resistance.

Further, the copolymer obtained by using a CGCT catalyst, particularly a copolymer having a styrene content of at most 20 mol %, especially at most 10 mol %, has a drawback that it is poor in its transparency for an application as a film, since the compositional distribution of the styrene content is relatively large, and it contains a copolymer component having a styrene content substantially lower than the average styrene content.

A copolymer having a styrene content of at least 50 mol % has a glass transition point of at least 30° C. and has high transparency and high initial modulus of elasticity, and is thus useful particularly for a plastic film or a shrinkable film. However, the above-mentioned pseudo random copolymers have no head-to-tail styrene chain, and the styrene content is accordingly up to 50 mol % at the maximum, and it is impossible to obtain a copolymer having a higher styrene content.

For stretch packaging in the filed of food packaging, films of polyvinyl chloride type have been mainly used, and films of olefin type made of a low density polyethylene, an ethylene-vinyl acetate copolymer or a linear low density polyethylene, have been used in some cases, as stretch films for so-called prepackaging, for wrapping food products such as vegetables, fishes, meats or daily dishes, directly or by placing them on plastic trays or the like.

Further, in the filed of general packaging and industrial packaging, an industrial stretch film such as a stretch film for pallet wrapping, is employed whereby wrapping is carried out by using the same film as described above, i.e. by highly stretching it.

However, in recent years, with respect to a film made of polyvinyl chloride, problems have been pointed out such as elution of the plasticizer contained therein or combustion gas formed during its incineration. Accordingly, development of a film made of a non-chlorine type material is desired as a substitute for the vinyl chloride type film.

With a single layered or composite stretch film comprising a low density polyethylene or an ethylene/vinyl acetate copolymer, stretchability of about 150% is maximum. If stretched more than that, there has bene a problem that the film breaks during the stretching.

In the case of a film made of a linear low density polyethylene, after wrapping, an excessive stress is likely to be exerted to a wrapped product, whereby the wrapped product or its tray is likely to be deformed, or the strength after wrapping tends to be weak, or the film tends to undergo non-uniform stretching, so that the appearance of a commercial product after wrapping tends to be poor. To solve such problems, if the density of the linear low density polyethylene is reduced, starting material pellets or the resulting film tends to be excessively sticky, which brings about a trouble during the production or in handling of wrapped products after wrapping. A stretch film has an adhesive property as its basic function, but if the adhesive property is excessive, there will be problems such that a trouble is likely to occur during the production of a film, and the yield tends to be substantially poor.

Further, if the density of the starting material for these olefin films is reduced, or a tackier is mixed, such a material will contain a relatively large amount of a low molecular weight component, which brings about a problem from the viewpoint of food safety in the application for food packaging. Further, the olefin type stretch films tend to be poor in elastic recovery, whereby in the application for food packaging, during display of the wrapped commercial products, the films are likely to have non-recoverable dents, for example, when pressed by fingers of consumers, thus leading to a problem that the package appearance of the commercial products be impaired, or the bottom sealing property tends to be inadequate.

It is an object of the present invention to provide a transparent novel aromatic vinyl compound-α-olefin random copolymer film having such drawbacks of convectional styrene-ethylene copolymer films overcome. Further, it is an object of the present invention to overcome the drawbacks of a stretch film and to provide a film which is useful for stretch packaging as being excellent in the self-adhesive property, mechanical strength such as tear propagation resistance, puncture resistance, breaking strength or elongation at break, transparency, stretchability, tying property and elastic recovery, for example, a stretch packaging film which is useful for packaging food products and which is suitable for a hand wrapper or for a stretch wrapping machine.

The present invention provides a film containing at least 5 wt % of an aromatic vinyl compound-α-olefin random copolymer having an aromatic vinyl compound content of from 1 to less than 99.9% by molar fraction and having head-to-tail chain structures comprising at least two aromatic vinyl compound units. Further, the present invention provides a film, preferably a transparent film, more preferably a stretch packaging film, containing an aromatic vinyl compound-ethylene random copolymer having an alternating structure of an aromatic vinyl compound and ethylene in a predetermined proportion, wherein the alternating structure is highly isotactic.

Namely, the present invention provides a film, preferably a highly transparent film, made of a composition or a single copolymer containing at least 5 wt %, preferably at least 50 wt %, more preferably at least 80 wt %, of a novel aromatic vinyl compound-α-olefin random copolymer having the following characteristics.

1) The aromatic vinyl compound content is from 1 to less than 99.9% by molar fraction.

2) It has head-to-tail chain structures comprising at least two aromatic vinyl compound units.

Further, the present invention provides a highly transparent film wherein an aromatic vinyl compound-α-olefin random copolymer to be used, has the following characteristic.

3) An aromatic vinyl compound-ethylene random copolymer wherein the alternating structure index λ represented by the following formula (i) of the alternating structure of an aromatic vinyl compound and ethylene represented by the following formula (1) contained in the copolymer, is smaller than 70 and larger than 1.

Further, the present invention provides a highly transparent film wherein an aromatic vinyl compound-ethylene random copolymer to be used, has the following characteristic.

4) An aromatic vinyl compound-ethylene random copolymer, wherein the stereoregularity of phenyl groups in the alternating structure of an aromatic vinyl compound and ethylene represented by the following formula (1) contained in the copolymer, is represented by an isotactic diad index m of more than 0.75.

$$\lambda = A3/A2 \times 100 \tag{i}$$

where A3 is the sum of areas of three peaks a, b and c attributable to an aromatic vinyl compound-ethylene alternating structure represented by the following formula (1'), obtained by 13C-NMR, and A2 is the sum of areas of peaks attributable to the main chain methylene and main chain methane carbon, as observed within a range of from 0 to 50 ppm by 13C-NMR using TMS as standard,

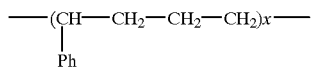
(1)

wherein Ph is an aromatic group such as a phenyl group, and x is an integer of at least 2 representing the number of repeating units.

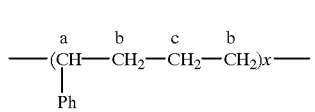
(1')

wherein Ph is an aromatic group such as a phenyl group, and x is an integer of at least 2 representing the number of repeating units.

Further, the present invention provides a stretch packaging film made of such a transparent film.

Further, the present invention provides a stretch packaging film containing at least 5 wt %, preferably at least 50 wt %, more preferably at least 80 wt %, of an aromatic vinyl compound-ethylene random copolymer having an aromatic vinyl compound content of from 1 to 50% by molar fraction, having head-to-tail chain structures comprising at least two aromatic vinyl compound units, and comprising a structure represented by the following formula (2) as the main structure, whereby the index θ represented by the following formula (ii), is larger than 70:

$$\theta = A1/A2 \times 100 \tag{ii}$$

where A1 is the sum of areas of peaks attributable to methane and methylene carbon α to ε in the following formula (2') as observed within a range of from 0 to 50 ppm by 13C-NMR using TMS as standard, and A2 is the sum of areas of peaks attributable to the main chain methylene and methine carbon, as observed within a range of from 0 to 50 ppm by 13C-NMR using TMS as standard:

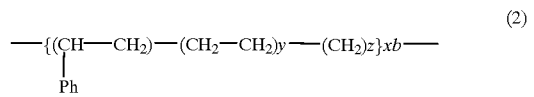
(2)

wherein Ph is an aromatic group such as a phenyl group, xb is an integer of at least 2 representing the number of repeating units, y is an integer of at least 1, which may be the same or different among the respective repeating units, and z is 0 or 1, which may be the same or different in the respective repeating units,

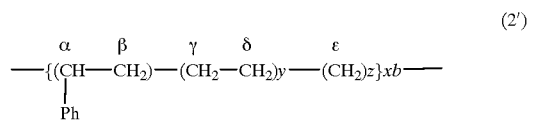
(2')

wherein Ph is an aromatic group such as a phenyl group, xb is an integer of at least 2 representing the number of repeating units, y is an integer of at least 1, which may be the same of different in the respective repeating units, and z is 0 or 1, which may the same or different in the respective repeating units.

Now, the aromatic vinyl compound-α-olefin random copolymer to be used in the present invention, will be described with reference to a styrene-ethylene random copolymer as a typical example.

The styrene-ethylene random copolymer to be used, has a head-to-tail chain structure comprising two or more styrene units, represented by the following formula. With reference to a styrene-ethylene random copolymer which is preferably employed, the head-to-tail chain structure comprising two or more aromatic vinyl compound units, will be described.

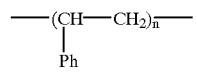

wherein n is an optional integer of at least 2, and Ph is an aromatic group such as a phenyl group.

The chain structure wherein two styrene units are bonded head-to-tail, presents peaks in the vicinity of from 42 to 43 ppm and from 43 to 45 ppm by 13C-NMR using TMS as standard and tetracholroethane-d2 as a solvent.

A chain structure wherein three or more styrene units are bonded head-to-tail, presents peaks also in the vicinity of from 40 to 41 ppm and from 43 to 44 ppm in a similar measurement.

Accordingly, a chain structure wherein two or more styrene units are bonded head-to-tail, presents a peak in the vicinity of from 40 to 45 ppm in a similar measurement.

On the other hand, with a conventional so-called pseudo random copolymer, no head-to-tail chain structure of styrene is observed even in the vicinity of the maximum styrene content of 50 mol %. Further, even if homopolymerization of styrene is attempted by using a catalyst for the production of a pseudo random copolymer, no polymer is obtainable.

Depending upon the polymerization condition or the like, a very small amount of an atactic styrene homopolymer may sometimes by obtained, but this should be understood that the polymer is formed by cation polymerization or radical polymerization due to coexisting methylalumoxane or an alkylaluminum included therein.

Further, the styrene-ethylene random copolymer of the present invention contains a copolymer in which the stereoregularity of phenyl groups in the chain structure of styrene units, is isotactic.

The stereoregularity of phenyl groups in the chain structure of styrene units being isotactic is meant for a structure wherein the isotactic diad index m (or a meso diad fraction) is more than 0.5, preferably more than 0.7, more preferably more than 0.8.

The stereoregularity of the chain structure of styrene units is determined by the peak position and peak area ratio of methylene carbon attributable to the head-to-tail styrene chain structure as observed by 13C-NMR and by the peak position and peak area ratio of a proton attributable to the main chain head-to-tail styrene chain structure as observed by 1H-NMR.

The styrene-ethylene random copolymer of the present invention is a copolymer comprising a chain structure wherein styrene units are bonded head-to-tail, a chain structure wherein ethylene units are bonded, and a structure wherein a styrene unit and an ethylene unit are bonded. The proportions of these structures in the copolymer vary depending upon the content of styrene or polymerization conditions such as the polymerization temperature. The proportions of these structures and the distribution of such structures are not limited to any particular structure distribution by statistic calculation.

As the styrene content decreases, the proportion of the chain structure in which styrene units are bonded head-to-tail, decreases. For example, in the case of a copolymer wherein the styrene content is not more than about 10 to 20 mol %, it may be difficult to directly observe a peak attributable to the chain structure wherein styrene units are bonded head-to-tail, by 13C-NMR. However, it is apparent that even when the styrene content is not more than 20 mol %, the chain structure wherein styrene units are bonded head-to-tail, is present in the copolymer although the proportion may be small, since a homopolymer having a stereoregularity can be produced at a high activity by homopolymerization of styrene by means of a transition metal catalyst component of the present invention or by the method of the present invention, i.e. it is possible to form a chain structure wherein styrene units are bonded substantially head-to-tail, and since, in the copolymer, at least by 13C-NMR, the proportion of the chain structure wherein styrene units are bonded head-to-tail, continuously changes corresponding to the styrene content of from 20 to 99 mol %. It is possible to observe a chain structure wherein styrene units are bonded head-to-tail, in a copolymer having a styrene content of not more than 20 mol % or not more than 10 mol %, by such a means as analyzing by 13C-NMR using styrene monomer enriched with 13C.

The same applies also to the chain structure of ethylene units.

In the styrene-ethylene random copolymer of the present invention, the stereoregularity of phenyl groups in the alternating copolymer structure of styrene and ethylene being an isotactic structure is meant for a structure wherein the isotactic diad index m (or a meso diad fraction) is more than 0.75, preferably more than 0.85, more preferably more than 0.95.

The isotactic diad index m of the alternating copolymer structure of ethylene and styrene, can be obtained by the following formula (iii) from an area Ar of the peak attributable to the r structure of the methylene carbon peak and an area Am of the peak attributable to the m structure, appearing in the vicinity of 25 ppm.

$$m=Am/(Ar-Am) \qquad (iii)$$

The positions of the peaks may sometimes shift more or less depending upon the measuring conditions or the solvent used. Here, the m structure represents a meso diad structure, and the r structure represents a racemic diad structure.

For example, when chloroform-d is used as a solvent and TMS is used as standard, the peak attributable to the r structure appears in the vicinity of from 25.4 to 25.5 ppm, and the peak attributable to the ma structure appears, in the vicinity of from 25.2 to 25.3 ppm.

Further, when tetracholroethane-d2 is used as a solvent and the center peak (shift based on TMS as standard: 73.89 ppm) of the triplet of tetracholroethane-d2 is used as standard, the peak attributable to the r structure appears in the vicinity of from 25.3 to 25.4 ppm, and the peak attributable to the m structure appears in the vicinity of from 25.1 to 25.2 ppm.

The styrene-ethylene random copolymer to be used in the present invention is characterized in that it has a highly stereoregular alternating structure of styrene and ethylene in combination with various structures such as ethylene chains having various lengths, head to head or tail to tail bonds of styrene and styrene chains having various lengths. Further, by the content of styrene in the copolymer, the proportion of the alternating structure can by varied within a range such that the value λ obtainable by the above formula (i) is larger than 1 and smaller than 70.

This stereoregular alternating structure is a crystallizable structure. Accordingly, the copolymer of the present invention can be made to have various properties in the form of a polymer having a crystalline, non-crystalline, partially crystalline or microcrystalline structure, by controlling the crystallinity by the styrene content or by a suitable method. The value λ being smaller than 70 is important in order to impart signification toughness and transparency to a crystalline polymer, or to obtain a partially crystalline polymer or a non-crystalline polymer.

As compared with conventional styrene-ethylene random copolymers having no stereoregularity, the copolymers of the present invention are improved in various properties such as the initial tensile modulus, hardness, breaking strength, elongation and solvent resistance within the respective ranges of styrene content at various degrees of crystallinity and thus exhibit characteristic physical properties as novel crystalline resins, thermoplastic elastomers or transparent soft resins.

The copolymer used in the present invention has a very uniform composition with a small distribution of the styrene content or the molecular weight in each polymer fraction, and thus is characterized in that it has high transparency.

Further, the glass transition point can be changed within a wide range of from −50° C. to 90° C. by changing the styrene content.

The method for producing the styrene-ethylene random copolymer to be used in the present invention, is not particularly limited. However, it is prepared preferably by polymerizing a styrene monomer and an ethylene monomer by using a transition metal compound which containers an unsubstituted or substituted cyclopentadienyl group, an unsubstituted or substituted idenyl group or an unsubstituted or substituted benzindenyl group and has at least one unsubstituted or substituted idenyl group, or unsubstituted or substituted benzindenyl group, and a cocatalyst. As a typical example of such a transition metal compound, a transition metal compound of the following formula (3) may be mentioned.

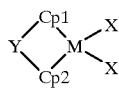
(3)

Here, each of Cp1 and Cp2 is an unsubstituted or substituted cyclopentadienyl group, an unsubstituted or substituted idenyl group, an unsubstituted or substituted fluorenyl group or an unsubstituted or substituted benzindenyl group. Further, Cp1 and Cp2 may be the same or different from one another, provided that at least one is an unsubstituted or substituted idenyl group or an unsubstituted or substituted benzindenyl group.

Y is carbon, silicon, germanium or boron having bonds to Cp1 and Cp2, and having other substituents, particularly preferably a methylene group having other substituents. As such substituents, hydrogen, halogen, a $C_{1-15}$ alkyl group, a $C_{6-14}$ aryl group, and a $C_{7-40}$ alkylaryl group, may, for example, be mentioned. These substituents may be the same or different or may have a cyclic structure. Y is, for example, —CH$_2$—, —CMe$_2$—, —CPh$_2$—, —SiH$_2$—, —SiMe$_2$—, —SiPh$_2$—, a cyclopentylidene group or a cyclohexylidene group, preferably —CH$_2$—, —CMe$_2$—, —CPh$_2$—, a cyclopentylidene group or a cyclohexylidene group. Here, Me represents a methyl group, and Ph represents a phenyl group.

X is hydrogen, a halogen such as chlorine or bromine, an alkyl group such as a methyl group or an ethyl group, an aryl group such as a phenyl group, a silyl group such as a trimethylsilyl group, or an alkoxy group such as a methoxy group, an ethoxy group or an isopropoxy group.

M is Zr, Hf or Ti.

The substituted or unsubstituted cyclopentadienyl group for Cp1 or Cp2 may, for example, be cyclopentadienyl, 2-alkyl-1-cyclopentadienyl, 2,4-dialkyl-1-cyclopentadienyl, 2,4,5-trialkyl-1-cyclopentadienyl, 2-trialkylsilyl-1-cyclopentadienyl, 2-trialkylsilyl-4-alkyl-1-cyclopentadienyl, 2-trialkylsilyl-4,5-dialkyl-1-cyclopentadienyl, 2-alkyl-4-aryl-1-cyclopentadienyl, 2-alkyl-4,5-diaryl-1-cyclopentadienyl, 2,5-dialkyl-4-aryl-1-cyclopentadienyl, 2,4-dialkyl-5-aryl-1-cyclopentadienyl, 2-aryl-1-cyclopentadienyl, 2-aryl-4-alkyl-1-cyclopentadienyl, 2-aryl-4,5-dialkyl-1-cyclopentadienyl, 2,3,4,5-tetraalkylcyclopentadienyl, or 2,3,4,5-tetraarylcyclopentadienyl.

The substituted or unsubstituted indenyl for Cp1 or Cp2 may, for example, be 1-indenyl, 2-alkyl-1-indenyl, 4-aryl-1-indenyl, 2,4-dialkyl-1-indenyl, 2,4-diaryl-1-indenyl, 2,4,6-trialkyl-1-indenyl, 4,5-diaryl-1-indenyl, 2,5,6-trialkyl-1-indenyl, 2,4,5-trialkyl-1-indenyl, 2-aryl-4-indenyl, 2,6-dialkyl-4-aryl-1-indenyl, 2-alkyl-5-aryl-1-indenyl, 2-alkyl-5,6-diaryl-1-indenyl, 2-alkyl-4,5-diaryl-1-indenyl, or 2-alkyl-4,6-diaryl-1-indenyl. Particularly preferred is 1-indenyl or 4-aryl-1-indenyl.

The substituted or unsubstituted benzindenyl group for Cp1 or Cp2 may, for example, be 4,5-benz-1-indenyl, 5,6-benz-1-indenyl, 6,7-benz-1-indenyl, 4,5-naphtho-1-indenyl, 4,5-pyrene-1-indenyl, 4,5-triphenylene-1-indenyl, 3-cyclopenta[c]phenanthryl, 1-cyclopenta[1]phenanthryl, or α-acenaphtho-1-indenyl. In case of substituted benzindenyl group, each pair of adjacent substituents may together with the atoms joining them, form a 5- to 8-member aromatic or aliphatic ring.

In the production of the aromatic vinyl compound-α-olefin random copolymer of the present invention, it is preferred to employ an organoaluminum compound and/or a boron compound as a cocatalyst together with the above transition metal compound.

As the cocatalyst, an organoaluminum compound represented by the following formula (4-1) or (4-2) is preferred.

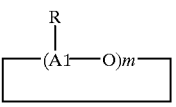
(4-1)

In the formula, R is a $C_{1-5}$ alkyl group, a $C_{6-10}$ aryl group or hydrogen, and m is an integer of from 2 to 100, wherein the respective R may be the same or different from one another.

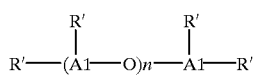
(4-2)

In the formula, R' is a $C_{1-5}$ alkyl group, a $C_{6-10}$ aryl group or hydrogen, and n is an integer of from 2 to 100, wherein the respective R' may be the same or different from one another.

Among them, an alumoxane such as methylalumoxane, ethylalumoxane, or triisobutylalumoxane, is preferred. Particularly preferred is methylalumoxane. If necessary, a mixture of these different types of alumoxanes may be employed. Further, such an alumoxane may be used in combination with an alkylaluminum such as trimethylaluminum, triethylaluminum or triisobutylaluminum, or a halogen-containing alkylaluminum such as dimethylaluminum chloride.

The boron compound to be used as a cocatalyst may, for example, be N,N-dimethylanilinium tetra (pentafluorophenyl) borate, trityltetra(pentafluorophenyl) borate, lithium tetra(pentafluorophenyl) borate or tri (pentafluorophenyl) borane.

Such a boron compound may be used in combination with the above-mentioned organoaluminum compound.

Especially when a boron compound is used as a cocatalyst, it is effective to add an alkylaluminum compound such as triisobutylaluminum to remove impurities, such as water, contained in the polymerization system, which adversely affect the polymerization.

The method for producing the aromatic vinyl compound-α-olefin random copolymer to be used in the present invention is not particularly limited, and in the presence or absence of a suitable solvent, the desired monomers may be mixed with the transition metal complex and the cocatalyst for polymerization. The solvent to be used, may, for example, be an aliphatic hydrocarbon such as pentane, hexane, heptane or cyclohexane, an aromatic hydrocarbon such as benzene, toluene, xylene, chloro-substituted benzene or chloro-substituted toluene, or a halogenated hydrocarbon such as methylene chloride or chloroform. These solvents may be used alone or in combination as a solvent mixture.

For the production of the styrene-ethylene random copolymer, the polymerization temperature is usually from −78° C. to 200° C., preferably from 0° C. to 160° C. The temperature lower than −78° C. is industrially disadvantageous, and if the temperature exceeds 200° C., decomposition of the metal complex takes place, such being undesirable.

For the production of the styrene-ethylene random copolymer, the pressure is usually from 0.01 to 1,000 atm, preferably from 1 to 100 atm, more preferably from 1 to 30 atm.

When an organoaluminum compound is used as the cocatalyst, it is used relative to the transition metal of the complex in an atomic ratio of aluminum/complex metal of from 0.1 to 100,000, preferably from 10 to 10,000. If this atomic ratio is smaller than 0.1, activation of the transition metal complex tends to be inadequate, and if it exceeds 100,000, such tends to be economically disadvantageous.

When a boron compound is used as the cocatalyst, it is employed usually in an atomic ratio of boron/complex metal of from 0.01 to 100, preferably from 0.1 to 10. particularly preferably 1. If this atomic ratio is less than 0.01, activation of the transition metal complex tends to be inadequate, and if it exceeds 100, such tends to be economically disadvantageous.

The metal complex and the cocatalyst may be mixed or formulated outside the polymerization tank, or may be mixed in the tank during the polymerization.

In the foregoing, the aromatic vinyl compound-α-olefin random copolymer to be used in the present invention, has been described with reference to styrene as a typical example of the aromatic vinyl compound. However, the aromatic vinyl compound to be used for the aromatic vinyl compound-α-olefin random copolymer of the present invention, may be styrene or various substituted sytrenes such as p-methylstyrene, m-methylstyrene, o-methylstyrene, o-t-butylstyrene, m-t-butylstyrene, p-t-butylstyrene, p-chlorostyrene, o-chlorostyrene, and α-methylstyrene. Further, a compound having a plurality of vinyl groups in one molecule, such as divinylbenzene, may also be mentioned. Industrially preferred is styrene, p-methylstyrene, or α-methylstyrene, and particularly preferred is styrene.

The α-olefin to be used for the aromatic vinyl compound-α-olefin random copolymer of the present invention, may, for example, be a $C_{2-20}$ α-olefin such as ethylene or propylene, or a diene compound such as butadiene, 1,4-hexadiene, 1,5-hexadiene, ethylidene-norbornene, or vinyl cyclohexene. These α-olefins may be used in combination as a mixture of two or more of them.

The weight average molecular weight of the aromatic vinyl compound-α-olefin random copolymer to be used in the present invention is at least 1,000, and if the physical properties as the copolymer are taken into consideration, it is preferably at least 10,000, more preferably at least 30,000. The molecular weight distribution (Mw/Mn) is usually at most 6, preferably at most 4, more preferably at most 3.

The aromatic vinyl compound-α-olefin random copolymer to be used in the present invention, is not necessarily a copolymer composed solely of an aromatic vinyl compound and an α-olefin, and it may contain other structures or may have other monomers copolymerized, so long as the structure and the stereoregularity are within the above specified ranges. Copolymerizable other monomers include, for example, $C_{3-20}$ α-olefins such as propylene, and conjugated and/or non-conjugated diene compounds such as butadiene, 1,4-hexadiene, 1,5-hexadiene, ethylidene-norbornene and vinyl cyclohexene. Further, tow or more members of the above mentioned aromatic vinyl compounds may be copolymerized.

Further, depending upon e.g. the polymerization conditions, an atactic homopolymer formed by thermal polymerization, radical polymerization or cationic polymerizaton of the aromatic vinyl compound may sometimes be contained in a small amount, but such an amount is not more than 10 wt % of the total amount. Such a homopolymer can be removed by extraction with a solvent, but may be left as included, so long as such an inclusion brings about no particular problems on the physical properties.

Further, for the purpose of improving the physical properties, other polymers may be blended thereto. Still further, a blend of a plurality of copolymers of the present invention differing in the styrene content, may be employed.

To the transparent film or the stretch packaging film of the present invention, other polymer, elastomer, rubber or the like may be blended, as the case requires. Likewise, a stabilizer, an aging preventive agent, a light resistance-improving agent, an ultraviolet absorber, a plasticizer, a softening agent, a lubricant, a processing assisting agent, a colorant, an antistatic agent, an antifogging agent, an anti-blocking agent, a crystal nucleating agent or the like may also be incorporated, as the case requires. These additives may be used alone or in combination of a plurality of them.

The resin which can be blended in the present invention, is not particularly limited and may, for example, be an olefin type resin such as isotactic polypropylene, syndiotactic polypropylene, atactic polypropylene, linear low density polyethylene (L-LDPE), low density polyethylene (LDPE), a block or random copolymer of ethylene or propylene with an α-olefin such as butene, hexene or octene, polymethylpentene, polybutene-1, and ethylene-acrylate copolymer, an ethylene-methacrylate copolymer or an ethylene-vinyl acetate copolymer, an ionomer resin, or a styrene type resin such as polystyrene, a styrene-methacrylate copolymer or a styrene-acrylonitrile copolymer.

The elastomer or rubber which can be blended in the present invention, is not particularly limited and may, for example, be a styrene-butadiene block copolymer (SBS) or its hydrogenated product (SEBS), a styrene-butadiene rubber (SBR) or its hydrogenated product, butadiene rubber (BR), a styrene-isoprene block copolymer (SIS) or its hydrogenated product (SEPS), or a styrene-butadiene-methyl methacrylate copolymer (MBS).

The aromatic vinyl compound-α-olefin random copolymer, preferably the aromatic vinyl compound-ethylene random copolymer, of the present invention, has a uniform composition and this is excellent in transparency. Accordingly, when such a copolymer is used alone as the main constituting units, a film excellent in transparency can be obtained. Specifically, the aromatic vinyl copound-α-olefin random copolymer constitutes preferably at least 80 wt %, more preferably at least 95 wt %, most preferably at least 98 wt %.

In the case of a film containing the aromatic vinyl compound-α-olefin random copolymer of the present invention as a composition, a method may be employed wherein a resin, elastomer, rubber or additive which has a refractive index close to the copolymer and which has a characteristic of e.g. being excellent in the transparency, is blended. In such a case, the difference in the refractive index between the two is preferably at most 0.2, more preferably at most 0.05, most preferably at most 0.02. Further, in such a case, if the difference in the compatibility parameter value is within a certain range, the transparency can further be improved. Specifically, the difference is preferably at most 5 $(cal/cm^3)^{1/2}$, more preferably 3 $(cal/cm^3)^{1/2}$, most preferably at most 1 (cal/cm$^3$)$^{1/2}$. The refractive indices and compatibility parameter values of the resins, elastomers, rubbers, additives, etc. to be blended, are known as disclosed, for example, in Polymer Handbook, third edition, published by WILEY INTERSCIENCE PUBLICATION.

Further, a film excellent in transparency can be obtained also in a case where the resin, elastomer, rubber, additive or the like is dispersed in the form of fine particles of, preferably at most 0.5 μm, more preferably at most 0.2 μm, most preferably at most 0.05 μm.

Especially, a film of the present invention prepared by extrusion molding, usually has excellent transparency with a total light transmittance of at least 80%, preferably at least about 88%.

The total light transmittance (or the total light ray transmittance) can be measured, for example, by the method disclosed in JIS K-7361-1, K-7105 or the like.

The softening agent which can be incorporated in the present invention, may, for example, be a petroleum resin, a terpene resin, a cumarone-indene resin, a rosin type resin or a hydrogenated product thereof.

The film or the stretch packaging film of the present invention may be subjected to surface treatment with e.g. corona, ozone or plasma, coating of an antifogging agent, coating of a lubricant, or printing.

The film or the stretch packaging film of the present invention may be subjected to stretch orientation by e.g. monoaxial or biaxial stretching, as the case requires.

The film or the stretch packaging film of the present invention may be bonded to the same film or to a material such as other thermoplastic resin by fusion by means of heat, ultrasonic waves or high frequency or by such a means as bonding by means of a solvent.

Further, when it is used as a food packaging stretch film, packaging can be carried out efficiently by means of an automatic wrapping machine or a manual wrapping machine.

To produce the transparent film or the stretch packaging film of the present invention, a conventional extrusion film forming method such as an inflation system or a T-die system, may be employed.

The thickness of the film or the stretch packaging film of the present invention, is not particularly limited, but is usually from 3 μm to 1 mm, preferably from 10 μm to 0.5 mm. To use the film as a food packaging stretch film, the thickness is preferably from 5 to 100 μm, more preferably from 10 to 50 μm.

For the purpose of improving the physical properties, the film or the stretch packaging film of the present invention may be co-extruded or laminated with other suitable film such as a film of e.g. isotactic or syndiotactic polypropylene, high density polyethylene, low density polyethylene (LDPE or LLDPE), polystyrene or polyethyleneterephthalate to form a multilayer film.

Further, the film or the stretch packaging film of the present invention has a self-adhesive property, as the contained aromatic vinyl compound-α-olefin random copolymer itself has a certain degree of a self-adhesive property. When a stronger self-adhesive property is required, it may be combined with other film having a self-adhesive property to form a multilayer film.

Further, when it is desired to obtain a stretch packaging film having a non-adhesive surface and an adhesive surface on the front and rear sides thereof, a multilayer film may be prepared which comprises a non-adhesive layer made of an aromatic vinyl compound-α-olefin random copolymer having a higher aromatic vinyl compound content or a linear low density polyethylene having a density of at least 0.916 in a thickness of from 5 to 30% of the total thickness, an interlayer made of the aromatic vinyl compound-α-olefin random copolymer used in the present invention, and an adhesive layer made of one having from 2 to 10 wt % of e.g. liquid polyisobutylene or liquid polybutadiene incorporated to the aromatic vinyl compound-α-olefin random copolymer used in the present invention, or one having from 2 to 10 wt % of liquid polyisobutylene or liquid polybutadiene incorporated to a linear low density polyethylene having a density of at most 0.916, or an ethylene/vinyl acetate copolymer, in a thickness of from 5 to 30% of the total thickness. Further, a suitable tackifier may be incorporated in a suitable amount.

Specific uses of the film of the present invention are not particularly limited. However, it may, for example, be used for a packaging film, a bag or a pouch. It is particularly useful for e.g. a food packaging stretch film or a pallet stretch film.

Further, when it has a thickness of e.g. more than 100 μm, it may be formed into a tray for packaging a food product or an electric product by a method of e.g. thermoforming such as vacuum forming, compression forming or air-pressure forming.

Now, the present invention will be described in further detail with reference to Examples. However, it should be understood that the present invention is by no means restricted to such specific Examples. In the following description, Ind represents an indenyl group, BInd a benzindenyl group, CpPhen a cyclopentaphenanthrene group, and Me a methyl group.

The analyses of polymers obtained in the respective Preparation Examples were carried out by the following methods.

The 13C-NMR spectrum was measured by means of α-500 manufactured by Nippon Denshi Kabushiki Kaisha as the apparatus using TMS as standard and chloroform-d or 1,1,2,2-tetrachloroethane-d2 as the solvent.

The styrene content in the polymer was determined by 1H-NMR. The determination was carried out by using JNMGX-270 or α-500 manufactured by Nippon Denshi Kabushiki Kaisha as the apparatus and chloroform-d or 1,1,2,2-tetrachloroethane-d2 as the solvent by comparing the intensity of the proton peak attributable to a phenyl group and the proton peak attributable to an alkyl group, measured by using TMS as standard.

With respect to the molecular weight, a molecular weight calculated as standard polystyrene was obtained by GPC (gell permeation chromatography). As the solvent, THF or 1,2,4-trichlorobenzene was used, and as the column, HLC-8020 manufactured by TOSOH CORPORATION, or GPC-7100 manufactured by Senshu Kagaku K. K., was used.

The film formation and the evaluation of the physical properties of the obtained films were carried out by the following methods.

Film formation

Employing an extruder type Laboplastmill (manufactured by Toyo Seiki K. K.), film formation was carried out using a screw of flighted mixing head Dulmage type (CR=2.9) with feeding/compression/metering (full flight+double flighted Dulmage)=7D/5D/9D and a coathanger type die (width: 150 mm, lip opening: 0.2 mmt), at a cylinder temperature of from 120 and 210° C. and a die temperature of from 150 to 210° C. at a screw rotational speed of 80 rpm.

Further, in Examples 5 to 7 and Comparative Example 1, a film having a thickness of 0.5 mm was prepared by hot pressing (temperature: 180° C., time: 3 minutes, pressure: 50 kg/cm$^2$) and used.

Compounding

Compounding in Example 14 was carried out by blending a polypropylene resin (F226D, manufactured by Grand Polymer Company), P-12 and Irganox 245 (manufactured by Chiba Geigy AG) in amounts of 90, 10 and 0.2 part by weight, respectively, preliminarily mixing them by a high speed mixer, followed by melt-kneading by means of a 30 mm twin-screw extruder (PCM-30) to obtain pellets.

The twin-screw extruder was operated at a cylinder temperature of from 160 to 200° C. at a die temperature of 180° C. at a screw rotational speed of 200 rpm.

In Example 13, without carrying out the above mentioned compounding by melt-kneading, pellets of two types of polymers were dry blended and used.

Tensile test

In accordance with JIS K-6251, a film was cut into a test piece shape of No. 1 type and measured at a tensile speed of 500 mm/min by means of AGS-100D model tensile tester, manufactured by Shimadzu Corporation.

With respect to a film having a thickness of 0.5 mm, the film was punched into a JIS No. 2 small (½) test piece shape and measured at a tensile speed of 100 mm/min or 20 mm/min (only Example 6) by means of Tensilon RTM-1T model tensile tester.

Elastic recovery

For the elastic recovery, a film was stretched by 10% in a width direction, and a rod having a forward end curvature radius of 12.5 mm was pressed on the film surface having a diameter of 45 mm, whereby the limiting depth for recovery in one minute was obtained. The test was repeated five times, and the elastic recovery was represented by the range of the maximum value and the minimum value (the minimum value to the maximum value) or by the average value of the five tests.

With respect to Examples 5 to 7, 15 and 16 and Comparative Example 1, the strain recovery value in the tensile test was measured by the following method.

Using a JIS No. 2 small (½) test piece, the test piece was pulled to a 10% strain by a tensile tester and maintained for 10 minutes, whereupon the stress was quickly released (without rebounding), and the strain recovery ratio after 10 minutes was represented by %.

Total light transmittance, haze

In accordance with JIS K-7361-1, the total light transmittance and the haze were measured by a Haze meter NDH-2000, manufactured by Nippon Denshoku K. K.

Chemical resistance test

For the chemical resistance test, a film or a sheet was immersed in a solvent for one week at room temperature, whereupon it was evaluated by visual observation, feeling test and measurement of the weight, and the results are shown in Table 5 in accordance with the following evaluation standards.

⊚: No change, swelling: less than 10%

○: Swelling: 10 to 40%

Δ: Slightly gelled, dissolved or hardened

X: Gelled, dissolved or hardened

Figure 1:
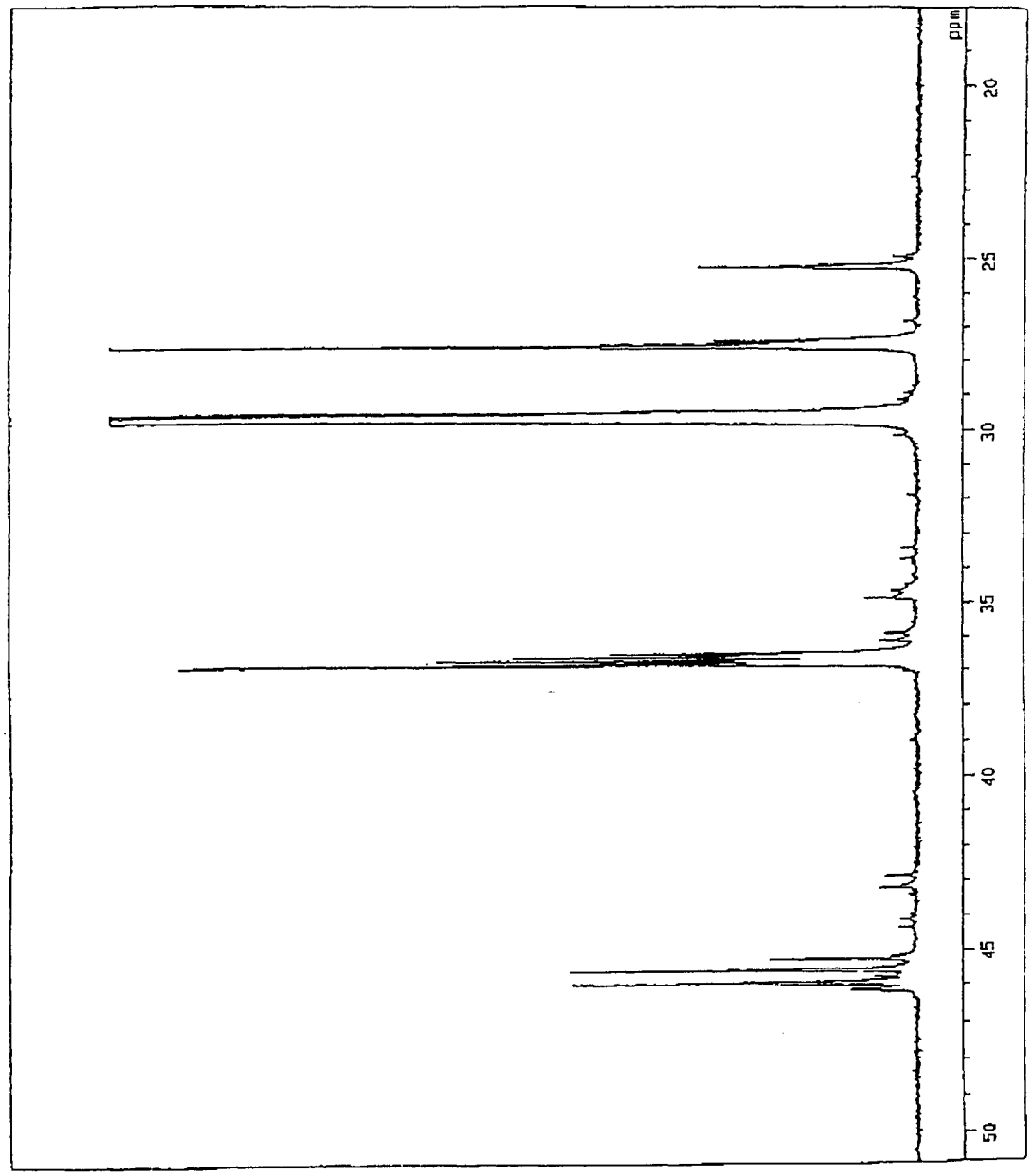
FIG. 1 is a 13C-NMR spectrum of the copolymer obtained in Example 5.

A Preparation of a transition metal compound rac-Dimethylmethylenebis (4,5-benz-1-indenyl) zirconium dichloride of the following formula (another name: rac-isopropylidenebis (4,5-benz-1-indenyl) zirconium dichloride, rac{BInd-C(Me)$_2$-BInd}ZrCl$_2$) was prepared by the following synthetic method.

4,5-benzindene was prepared in accordance with Organometallics, 13, 964 (1994).

A-1 Preparation of 1,1-isopropylidene-4,5-benzindene

Preparation of 1,1-isopropylidene-4,5-benzindene was carried out with reference to the synthesis of 6,6-diphenylfulvene disclosed in Can. J. Chem., 62, 1751 (1984). However, as the starting materials, acetone was used instead of benzophenone, and 4,5-benzindene was used instead of cyclopentadiene.

A-2 Preparation of isopropylidenebis-4,5-benz-1-indene

In an Ar atmosphere, 21 mmol of 4,5-benzindene was dissolved in 70 ml of THF, and an equivalent amount of BuLi was added at 0° C., followed by stirring for 3 hours. THF having 21 mmol of 1,1-isopropylidene-4,5-benzindene dissolved therein, was added thereto, and the mixture was stirred at room temperature overnight. 100 ml of water and 150 ml of diethyl ether were added thereto, followed by shaking. The organic layer was separated and washed with a saturated sodium chloride aqueous solution and then dried over anhydrous sodium sulfate. The solvent was distilled off under reduced pressure. The obtained yellow solid was washed with hexane and dried to obtain 3.6 g (yield: 46%) of isopropylidenebis-4,5-benz-1-indene.

The 1H-NMR spectrum was measured, whereby peaks were observed at positions of from 7.2 to 8.0 ppm (m, 12H), 6.65 ppm (2H), 3.75 ppm (4H), and 1.84 ppm (6H).

The measurement was carried out using TMS as standard and CDCl$_3$ as the solvent.

A-3 Preparation of rac-dimethylmethylenebis(4,5-benz-1-indenyl)zirconium dichloride In an Ar atmosphere, 7.6 mmol of isopropylidenebis-4,5-benz-1-indene and 7.2 mmol of zirconium tetrakisdimethylamide {Zr(NMe$_2$)$_4$} were charged together with 50 ml of toluene, followed by stirring at 130° C. for 10 hours. Toluene was distilled off under reduced pressure, and 100 ml of methylene chloride was added thereto, followed by cooling to −78° C. Then, 14.4 mmol of dimethylamine hydrochloride was slowly added thereto, and the mixture was slowly heated to room temperature and stirred for two hours. The solvent was distilled off, and the obtained solid was washed with pentane and then with a small amount of THF to obtain 0.84 g (yield: 21%) of yellowish orange rac-dimethylmethylenebis(4,5-benz-1-indenyl)zirconium dichloride represented by the following formula.

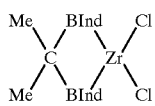

The 1H-NMR spectrum was measured, whereby peaks were observed at positions of 8.01 ppm (m, 2H), 7.75 ppm (m, 2H), 7.69 ppm (d, 2H), 7.48 to 7.58 ppm (m, 4H), 7.38 ppm (d, 2H), 7.19 ppm (d, 2H), 6.26 ppm (d, 2H), 2.42 ppm (s, 6H).

The measurement was carried out by using TMS as standard, and CDCl$_3$ as the solvent. The elemental analysis was carried out by means of an elemental analysis apparatus 1108 model (manufactured by Faysons, Italy), to obtain the results being C63.86%, and H3.98%. The theoretical values are C65.39%. and H4.16%.

B Preparation of a transition metal compound rac-Dimethylmethylene(1-indenyl) (4,5-benz-1-indenyl) zirconium dichloride (another name: rac-isopropylidene(1-indenyl)(4,5-benz-1-indenyl)zirconium dichloride, rac{Ind—C(Me)$_2$—BInd}ZrCl$_2$) was prepared by the following synthetic method.

B-1 Preparation of isopropylidene(1-indene)(4,5-benz-1-indene)

In an Ar atmosphere, 14 mmol of indene was dissolved in 50 ml of THF, and an equivalent amount of BuLi was added at 0° C., followed by stirring for 10 hours. 10 ml of THF having 13 mmol of 1,1-isopropylidene-4,5-benzindene dissolved therein, was added thereto, and the mixture was stirred at room temperature overnight. Then, 50 ml of water and 100 ml of diethyl ether were added thereto, followed by shaking. The organic layer was separated and washed with a saturated sodium chloride aqueous solution and then dried over anhydrous sodium sulfate. The solvent was distilled off under reduced pressure. The obtained product was purified by a column to obtain 2.5 g (yield: 59%) of isopropylidene (1-indene)(4,5-benz-1-indene.

B-2 Preparation of rac-dimethylmethylene(1-indenyl)(4,5-benz-1-indenyl)zirconium dichloride In an Ar atmosphere, 6.5 mmol or isopropylidene(1-indene)(4,5-benz-1-indene) and 6.5 mmol of zirconium tetrakisdimethylamide $\{Zr(NMe_2)_4\}$ were charged together with 40 ml of toluene, followed by stirring at 130° C. for 10 hours. Toluene was distilled off under reduced pressure, and 100 ml of methylene chloride was added, followed by cooling to −78° C. 13 mmol of dimethylamine hydrochloride was slowly added thereto, and the mixture was slowly heated to room temperature and stirred for two hours. The solvent was distilled off, and then the obtained solid was washed with pentane and then with a small amount of methylene chloride, to obtain 0.76 g (yield: 24%) of orange colored rac-dimethylmethylene(1-indenyl)(4,5-benz-1-indenyl)zirconium dichloride.

The 1H-NMR spectrum was measured, whereby peaks were observed at positions of 7.05 to 8.04 ppm (m, 10H, provided that the peak at 7.17 ppm is excluded), 7.17 ppm (d, H), 6.73 ppm (d, H), 6.25 ppm (d, H), 6.18 ppm (d, H), 2.41 ppm (m, 3H), 2.37 ppm (m, 3H).

The measurement was carried out using TMS as standard and $CDCl_3$ as the solvent.

C Preparation of a transition metal compound rac-Dimethylmethylenebis(3-cyclopenta[c]phenanthryl) zirconium dichloride of the following formula (another name: rac{CpPhen—CMe₂—CpPhen}ZrCl₂) was prepared as follows. Here, Phen represents [c]phenanthryl.

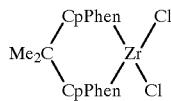

1H or 3H-cyclopenta[c]phenanthrene was prepared in accordance with the method disclosed in Organometallics, 16, 3413 (1997).

C-1 Isopropylidenebis(cyclopenta[c]phenanthrene)

In an Ar atmosphere, 32 mmol of 1H or 3H-cyclopenta [c]phenanthrene was added to 40 ml of dimethoxyethane having 3.0 g of potassium hydroxide suspended therein, followed by stirring at room temperature for 30 minutes. Then, 15 mmol of acetone was added thereto, and the mixture was stirred at 60° C. for two hours.

The reaction mixture was neutralized by an addition of a 10% phosphoric acid aqueous solution and then extracted with methylene chloride. The organic layer was washed with water and dried. Methylene chloride was distilled off. By recrystallization from a methylene chloride-diethyl ether solution, 1.5 g of isopropylidenebis(cyclopenta[c] phenanthrene) was obtained as white crystals.

The 1H-NMR spectrum was measured, whereby peaks were observed at positions of 1.93 ppm (6H, s), 4.20 ppm (4H, d), 6.89 ppm (2H, t), 7.5 to 7.9 ppm (14H, m), 8.91 ppm (2H, d).

The measurement was carried out by using TMS as standard and $CDCl_3$ as the solvent.

C-2 Preparation of rac-dimethylmethylenebis(3-cyclopenta[c]phenanthryl)zirconium dichloride In an Ar stream, 2.0 mmol of isopropylidenebis (cyclopenta[c]phenanthrene) and 2.0 mmol of zirconium tetrakisdimethylamide $\{Zr(NMe_2)_4\}$ were charged together with 20 ml of toluene and stirred for 7 hours under reflux. Toluene was distilled off under reduced pressure, and 50 ml of methylene chloride was added thereto, followed by cooling to −50° C. Then, 4.0 mmol of dimethylamine hydrochloride was slowly added thereto, and the mixture was slowly heated to room temperature and further stirred for two hours. The solvent was distilled off, and then the obtained solid was washed with pentane and then with a small amount of methylene chloride to remove the meso compound and the ligand to obtain 0.36 g of rac-dimethylmethylenebis(3-cyclopenta[c]phenanthryl) zirconium dichloride as yellowish orange crystals.

The 1H-NMR spectrum was measured, whereby peaks were observed at positions of 2.55 ppm (6H, s), 6.49 ppm (2H, d), 7.55 to 8.02 ppm (16H, m), 8.82 ppm (2H, d).

The measurement was carried out by using TMS as standard and $CDCl_3$ as the solvent.

PREPARATION EXAMPLE 1

Preparation of Copolymer P-1

Polymerization was carried out by using an autoclave having a capacity of 10 L and equipped with a stirrer and a jacket for cooling and heating.

4,000 ml of dry toluene and 800 ml of dry styrene were charged and stirred by heating to an internal temperature of 50° C. About 100 L of nitrogen was bubbled to purge the interior of the system, and 8.4 mmol of triisobutylaluminum (TIBA) and methylalumoxane (PMAO, manufactured by TOSOH ACZO K.K.) in an amount of 8.4 mmol on the basis of Al, were added. Ethylene was immediately introduced and stabilized under a pressure of 10 kg/cm²G, whereupon about 50 ml of a toluene solution having 0.84 μmol of catalyst rac{BInd—C(Me)₂—BInd}ZrCl₂ and 0.84 mmol of triisobutylaluminum dissolved therein, was added to the autoclave from a catalyst tank installed above the autoclave. While maintaining the internal temperature at 50° C. and the ethylene pressure at 10 kg/cm²G (1.1 MPa), polymerization was carried out for 5 hours. During the polymerization, the temperature of the reaction solution and the consumption rate of ethylene were monitored by a flow integrating meter, and polymerization was carried out until the polymerization reaction substantially completed. After termination of the polymerization, the obtained polymerization solution was gradually added to excess methanol which was vigorously stirred to precipitate the formed polymer. The polymer was dried under reduced pressure at 60° C. until a weight change was no longer observed to obtain 464 g of a copolymer having a styrene content of 11.5 mol %.

The results are shown in Table 1.

PREPARATION EXAMPLES 2 TO 6

Preparation of Copolymers P-2 to P-6

Polymerization was carried out in the same manner as in Example 1 under the conditions as identified in Table 1.

COMPARATIVE PREPARATION EXAMPLE 1

Preparation of Copolymer CP-1

As the complex, a CGCT (constrained geometrical structure) type Ti complex (tertiary butylamido)dimethyl (tetramethyl-η5-cyclopentadienyl)silane titanium dichloride (Me$_4$Cp—SiMe$_2$—NtBuTiCl$_2$; CGCT type catalyst) was used, and polymerization was carried out under the conditions as identified in Table 1.

PREPARATION EXAMPLE 7

Preparation of Copolymer P-7

Polymerization was carried out by using a polymerization reactor having a capacity of 150 L and equipped with a stirrer and a jacket for cooling and heating. 46 L of dry cyclohexane and 8 L of dry styrene were charged and stirred by heating at an internal temperature of 40° C. 84 mmol of triisobutylaluminum and methylalumoxane (MMAO-3A, manufactured by TOSOH ACZO K.K.) in an amount of 840 mmol based on Al, were added thereto. Ethylene was immediately introduced and stabilized under a pressure of 9 kg/cm$^2$G. Then, 100 ml of a toluene solution having 76 μmol of catalyst rac-dimethylmethylenebis(4,5-benz-1-indenyl) zirconium dichloride obtained in the above Preparation Example, dissolved therein, was added to the polymerization reactor from a catalyst tank installed above the polymerization reactor. Heat generation started immediately. Therefore, cooling water was introduced to the jacket. The internal temperature rose to the maximum of 75° C. and then gradually lowered and finally became 70° C. Polymerization was carried out for 4 hours while maintaining the ethylene pressure at 9 kg/cm$^2$G.

Under vigorous stirring, the polymerization solution was fed over a period of one hour into water of 150 L heated to 85° C. and containing a dispersant. Then, the mixture was stirred at 97° C. for one hour, and hot water containing crumbs was fed into cool water, whereupon crumbs were recovered. The obtained crumbs were dried in an air stream of 50° C.

The results are shown in Table 2. The dried crumbs were formed into pellets by a tandem extruder equipped with a hot cut pelletizer (Cokneader PLK-46, manufactured by Büss Company). The operation was carried out under the following conditions.

First extruder: Cylinder temperature of 80° C. and screw rotational speed of 120 rpm.

Second extruder: Cylinder temperature of 120° C., die temperature of 135° C., and screw rotational speed of 22 rpm.

PREPARATION EXAMPLE 8 TO 12

Preparation of Copolymers P-8 to P-12

Polymerization and post treatment were carried out in the same manner as in Preparation Example 7 under the conditions as identified in Table 2.

In Tables 1 and 2, the styrene contents obtained from the 1H-NMR spectrum measurements of copolymers obtained in the respective Preparation Examples and Comparative Preparation Examples, the molecular weights obtained from the GPC measurements, the molecular weight distributions, the tacticity of the styrene-ethylene alternating structure obtained from the 13C-NMR spectrum measurements, values λ, values θ, and the melting points obtained by the DSC measurements, are shown.

Figure 2:
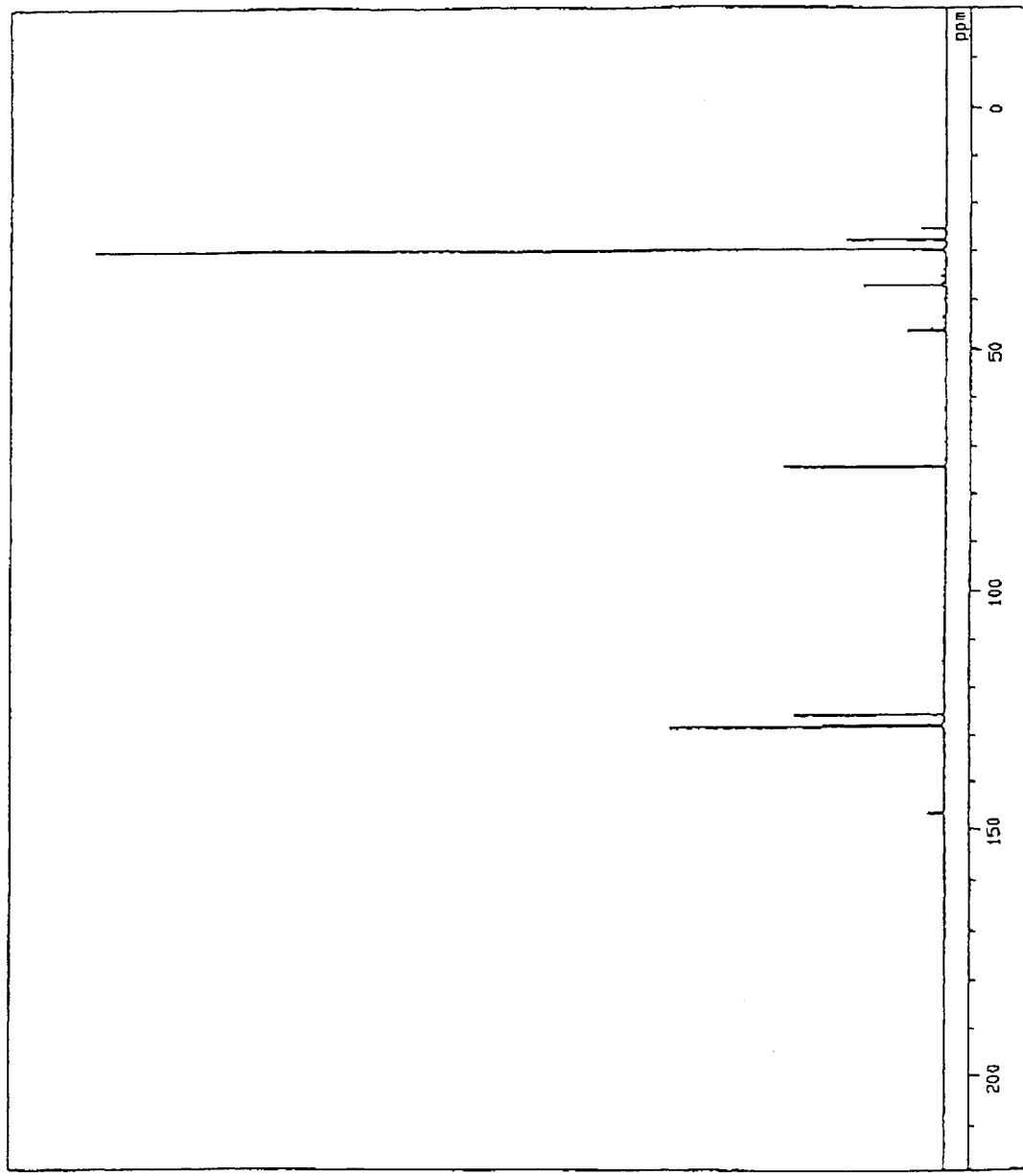
FIG. 2 is a 13C-NMR spectrum of the copolymer obtained in Example 5.

The 13C-NMR spectrum of the copolymer obtained in Example 5 is shown in FIGS. 1 and 2, as an example of the copolymer obtained by the present invention.

The peaks (42.3 to 43.2 ppm: methine carbon, 43.7 to 44.5 ppm: methylene carbon) attributable to the head-to-tail chain structure comprising two styrene units, is clearly observed.

TABLE 1

| | | | | Polymerization conditions | | | | |
| --- | --- | --- | --- | --- | --- | --- | --- | --- |
| | Polymer | Catalyst μmol | MAO mmol | TIBA mmol | St/Tol. ml/ml | Et MPa | PTE ° C. | PTI hr |
| Prep. Ex. 1 | P-1 | A; 0.84 | P; 8.4 | 8.4 | 800/4000 | 1.1 | 50 | 5 |
| Prep. Ex. 2 | P-2 | A; 2.1 | M; 84 | 8.4 | 800/4000 | 1.1 | 50 | 4 |
| Prep. Ex. 3 | P-3 | A; 8.4 | M; 84 | 8.4 | 2400/2400 | 1.1 | 50 | 1.5 |
| Prep. Ex. 4 | P-4 | B; 8.4 | M; 84 | 8.4 | 2400/2400 | 1.1 | 50 | 5 |
| Prep. Ex. 5 | P-5 | C; 8.4 | P; 8.4 | 8.4 | 2400/2400 | 1.1 | 70 | 1.0 |
| Prep Ex. 6 | P-6 | C; 21 | M; 84 | 8.4 | 4000/800 | 0.1 | 50 | 2.5 |
| Comp. Prep. Ex. 1 | CP-1 | D; 21 | M; 84 | 8.4 | 1300/3500 | 1.1 | 50 | 2.5 |

*1: Isotactic diad index
A; rac-dimethylmethylenebis(4,5-benz-1-indenyl)zirconium dichloride
B; rac-dimethylmethylene(4,5-benz-1-indenyl)(1-indenyl)zirconium dichloride
C; rac-dimethylmethylenebis(3-cyclopenta[c]phenanthryl)zirconium dichloride
D; (tert-Butylamino)dimethyl(tetramethyl-η5-cyclopentadienyl)silanetitanium dichloride
P; PMAO
M; MMAO
PTE: Polymerization temperature
TI: Polymerization time TABLE 1-continued

| | Polymer | St content mol % | Mw | Mw/Mn | Tacticity Value m *1 | Value λ | Value θ | Melting point °C. |
|---|---|---|---|---|---|---|---|---|
| Prep. Ex. 1 | P-1 | 11.5 | 18.5 | 2.2 | >0.95 | 6 | 99 | 75 |
| Prep. Ex. 2 | P-2 | 15.5 | 12.0 | 1.5 | >0.95 | 11 | 98 | 83 |
| Prep. Ex. 3 | P-3 | 37.1 | 33.0 | 2.3 | >0.95 | 41 | 90 | 103 |
| Prep. Ex. 4 | P-4 | 31.8 | 30.0 | 1.8 | >0.95 | 35 | 96 | 83 |
| Prep. Ex. 5 | P-5 | 17.4 | 9.4 | 2.1 | >0.95 | 6 | 99 | Nil |
| Prep. Ex. 6 | P-6 | 60.0 | 28.4 | 2.4 | >0.95 | — | — | Nil |
| Comp. Prep. Ex. 1 | CP-1 | 13.0 | 18.7 | 1.5 | 0.5 | — | — | 63 |

*1: Isotactic diad index
—: Not measured

TABLE 2

| | Polymer | Catalyst μmol | MAO mmol | TIBA mmol | St/CyH. L/L | Et MPa | PTE °C. | PTI hr |
|---|---|---|---|---|---|---|---|---|
| Prep. Ex. 7 | P-7 | A; 76 | M; 840 | 84 | 8/64 | 1.0 | 40~75 | 4 |
| Prep. Ex. 8 | P-8 | A; 78 | M; 840 | 84 | 12/60 | 1.0 | 40~82 | 2.3 |
| Prep. Ex. 9 | P-9 | A; 76 | M; 840 | 84 | 5/64 | 1.0 | 40~71 | 2 |
| Prep. Ex. 10 | P-10 | B; 79 | M; 840 | 84 | 5/80 | 1.0 | 40~71 | 3 |
| Prep. Ex. 11 | P-11 | A; 83 | M; 840 | 84 | 18/54 | 0.5 | 40~51 | 4 |
| Prep. Ex. 12 | P-12 | A; 78 | M; 840 | 84 | 12/60 | 1.0 | 40~82 | 2.3 |

*1: Isotactic diad index
A; rac-dimethylmethylenebis(4,5-benz-1-indenyl)zirconium dichloride
B; rac-dimethylmethylene(4,5-benz-1-indenyl)(1-indenyl)zirconium dichloride
M; MMAO
CyH: Cyclohexane
PTE: Polymerization temperature
PTI: Polymerization time

| | Polymer | St content mol % | Mw | Mw/Mn | Tacticity Value m *1 | Value λ | Value θ | Melting point °C. |
|---|---|---|---|---|---|---|---|---|
| Prep. Ex. 7 | P-7 | 21 | 15.4 | 3.0 | >0.95 | — | 99 | 51 |
| Prep. Ex. 8 | P-8 | 28 | 15.8 | 2.5 | >0.95 | — | 98 | 65 |
| Prep. Ex. 9 | P-9 | 15 | 11.8 | 2.7 | >0.95 | — | 90 | 65 |
| Prep. Ex. 10 | P-10 | 9.5 | 13.0 | 2.3 | >0.95 | 3 | 96 | 79 |
| Prep. Ex. 11 | P-11 | 39 | 34.8 | 2.0 | >0.95 | 48 | 99 | 75 |
| Prep. Ex. 12 | P-12 | 26 | 16.9 | 2.5 | >0.95 | 19 | 98 | 44 |

*1: Isotactic diad index
—: Not measured

EXAMPLES 1 TO 14 AND COMPARATIVE EXAMPLES 1 TO 3

The copolymers obtained by the respective Preparation Examples were formed into films and evaluated by the above mentioned methods, and the results are shown in Tables 3 and 4. Further, for the purpose of comparison, a polyvinyl chloride type stretch film (Denka Wrap Shinsen, manufactured by Denki Kagaku Kogyo K.K.) and a polyethylene type stretch film (Denka Nice Wrap, manufactured by Denki Kagaku Kogyo K.K.) were also evaluated, and the results are shown in the Tables. In Example 7, a three layer film of EVA/P-10/EVA=1/2/1 (thickness ratio) was prepared and evaluated. As EVA (ethylene-vinyl acetate copolymer), NUC-3753, manufactured by Nippon Unicar K.K., was employed.

The results of the chemical resistance test were shown in Table 5.

TABLE 3

| | | Breaking strength MPa | | Elongation at break % | | Tensile modulus MPa | | Elastic recovery | Thickness | Haze | Total light transmittance |
|---|---|---|---|---|---|---|---|---|---|---|---|
| | Polymer | MD | TD | MD | TD | MD | TD | mm 4) | μm | % | % |
| Ex. 1 | P-1 | 25 | 28 | 380 | 600 | 24 | 30 | 18~21 | 20 | 1.5 | 90.0 |
| Ex. 2 | P-2 | 34 | 38 | 400 | 650 | 22 | 25 | 22~23 | 18 | 2.0 | 91.0 |
| Ex. 3 | P-3 | 15 | 21 | 450 | 700 | 26 | 31 | 18~20 | 25 | 0.7 | 92.7 |
| Ex. 4 | P-4 | 20 | 23 | 420 | 620 | 15 | 16 | 18~21 | 25 | 3.3 | 91.0 |
| Ex. 5 | P-5 1) | 11 | | 1053 | | 4.2 | | 90 | 500 | 36.3 | 80.1 |
| Ex. 6 | P-6 1) | 44 | | 7 | | 945 | | 90 | 500 | 7.3 | 89.1 |
| Ex. 7 | EVA/P-10 1) | 24 | | 670 | | 26 | | 90 | 500 | 37.1 | 87.8 |
| Comp. Ex. 1 | CP-1 1) | 29 | | 623 | | 12 | | 85 | 500 | 58.2 | 79.5 |
| Comp. Ex. 2 | PVC 2) | 24 | 14 | 160 | 220 | 38 | 34 | 18~20 | 13 | 0.6 | 92.4 |
| Comp. Ex. 3 | P E 3) | 21 | 30 | 440 | 460 | 55 | 56 | 11~12 | 15 | 0.5 | 92.7 |

*: MD and TD mean the direction of extrusion of the film and the direction perpendicular thereto, respectively.
—: Not measured
1) A film having a thickness of about 0.5 mm molded by hot pressing, was cut into a dumbbell shape and subjected to the measurement.
2) Denka Wrap Shinsen
3) Denka Nice Wrap
4) Minimum value to maximum value

TABLE 4

| | | Breaking strength MPa | | Elongation at break % | | 10% modulus MPa | | Elastic recovery | Thickness | Haze | Total light transmittance |
|---|---|---|---|---|---|---|---|---|---|---|---|
| | Polymer | MD | TD | MD | TD | MD | TD | mm 1) | μm | % | % |
| Ex. 8 | P-7 | 34 | 14 | 177 | 680 | 18 | 14 | 31 | 88 | 4.6 | 90.2 |
| Ex. 9 | P-8 | 29 | 13 | 151 | 686 | 12 | 10 | 34 | 88 | 3.5 | 89.4 |
| Ex. 10 | P-9 | 30 | 13 | 169 | 672 | 27 | 17 | 32 | 72 | 6.4 | 88.3 |
| Ex. 11 | P-10 | 42 | 23 | 250 | 534 | 52 | 38 | 17 | 31 | 4.1 | 91.6 |
| Ex. 12 | P-11 | 37 | 33 | 261 | 464 | 25 | 14 | 18 | 45 | 10.9 | 90.4 |
| Ex. 13 | P-10/P-11 | 33 | 31 | 213 | 481 | 30 | 27 | 39 | 41 | 46.8 | 87.8 |
| Ex. 14 | PP/P-12 | 44 | 30 | 541 | 752 | 169 | 158 | 41 | 31 | 11.6 | 89.1 |
| Ex. 15 | P-9 | 32 | | 653 | | 13 | | 90 | 500 | 2.7 | 90.1 |
| Ex. 16 | P-10 | 40 | | 677 | | 18 | | 90 | 500 | 4.3 | 89.8 |

1) Average of n = 5

TABLE 5

| | | Results of chemical resistance tests | | |
|---|---|---|---|---|
| | Polymer | Olive oil | Hexane | Acetone |
| Ex. 1 | P-1 | ⊚ | ○ | ⊚ |
| Ex. 2 | P-2 | ⊚ | ○ | ⊚ |
| Ex. 3 | P-3 | ⊚ | ⊚ | ○ |
| Ex. 4 | P-4 | ⊚ | ○ | ○ |
| Ex. 5 | P-5 | ⊚ | ○ | ○ |
| Ex. 6 | P-6 | ⊚ | ○ | ○ |
| Ex. 7 | P-7 | ⊚ | ○ | ○ |
| Ex. 8 | P-8 | ⊚ | ○ | ○ |
| Ex. 9 | P-9 | ⊚ | ○ | ○ |
| Ex. 10 | P-10 | ⊚ | ○ | ⊚ |
| Ex. 11 | P-11 | ⊚ | ○ | ⊚ |
| Ex. 12 | P-12 | ⊚ | ⊚ | ○ |

TABLE 5-continued

| | | Results of chemical resistance tests | | |
|---|---|---|---|---|
| | Polymer | Olive oil | Hexane | Acetone |
| Comp. Ex. 1 | CP-1 | o | x (Gelled) | o |
| Comp. Ex. 2 | PVC[1)] | Δ (Slightly hardened) | x (Hardened) | x (Gelled) |

[1)]DenkaWrap Shinsen

The transparent film or the stretch film of the present invention has transparency as well as sufficient breaking strength and tensile modulus. Especially, the copolymer having a styrene content of not higher than 50 mol %, is characterized by having the excellent elongation, elastic recovery and solvent resistance in addition to these characteristics.

Further, needless-to-say, the copolymer according to the present invention contains substantially no chlorine element.

Further, the stretch film according to the present invention has a self-adhesive property by itself. Accordingly, when it is used as an actual stretch film, it is not necessary to laminate or mix an adhesive layer of e.g. an ethylene-vinyl acetate copolymer, or the thickness of such a layer may be made thin.

Accordingly, it is particularly useful as a packaging material for food products.

Further, a film of the present invention having a styrene content of at least 50 mol % has high strength and transparency and thus is useful as a packaging film, particularly as a shrinkable film.

The transparent film of the present invention is suitable for shrink packaging, stretch packaging or other packaging. It has a particularly excellent nature as a stretch packaging film. For example, it is excellent in the self-adhesive property, the mechanical strength such as tear propagation resistance, puncture resistance, breaking strength, elongation at break, elastic recovery, transparency, stretchability, tying property, oil resistance, chemical resistance and elastic recovery, and it is particularly useful for stretch packaging of food products. This packaging film is suitable for manual packaging or for automatic packaging.

What is claimed is:

1. A film containing at least 5 wt % of an aromatic vinyl compound-α-olefin random copolymer having an aromatic vinyl compound content of from 1 to less than 99.9% by molar fraction and having head-to-tail chain structures comprising at least two aromatic vinyl compound units.

2. The film according to claim 1, which contains at least 80 wt % of the aromatic vinyl compound-α-olefin random copolymer.

3. The film according to claim 1, wherein the aromatic vinyl compound-α-olefin random copolymer is an aromatic vinyl-ethylene random copolymer.

4. The film according to claim 1, which has a transparency such that the total light transmittance is at least 80%.

5. A stretch packaging film made of the film as defined in claim 4.

6. The film according to claim 1, wherein the aromatic vinyl compound-α-olefin random copolymer is an aromatic vinyl compound-ethylene random copolymer wherein the stereoregularity of phenyl groups in the alternating structure of an aromatic vinyl compound and ethylene represented by the following formula (1) contained in the copolymer, is represented by an isotactic diad index m of more than 0.75:

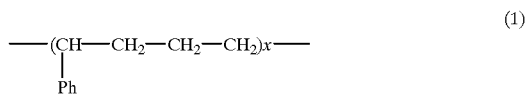

wherein Ph is an aromatic group and x is an integer of at least 2 representing the number of repeating units.

7. A film containing at least 5 wt % of an aromatic vinyl compound-ethylene random copolymer having an aromatic vinyl compound content of from 1 to less than 99.9% by molar fraction, having head-to-tail chain structures comprising at least two aromatic vinyl compound units and having the following characteristic:

the alternating structure index λ represented by the following formula (i) is smaller than 70 and larger than 1:

$$\lambda = A3/A2 \times 100 \qquad (i)$$

where A3 is the sum of areas of three peaks a, b and c attributable to an aromatic vinyl compound-ethylene alternating structure represented by the following formula (1'), obtained by 13C-NMR, and A2 is the sum of areas of peaks attributable to the main chain methylene and main chain methine carbon, as observed within a range of from 0 to 50 ppm by 13C-NMR using TMS as standard,

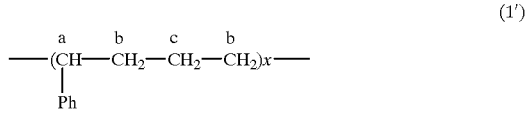

wherein Ph is an aromatic group and x is an integer of at least 2 representing the number of repeating units.

8. The film according to claim 7, wherein the aromatic vinyl compound-ethylene random copolymer is an aromatic vinyl compound-ethylene random copolyer wherein the stereoregularity of phenyl groups in the alternating structure of an aromatic vinyl compound and ethylene contained in the copolymer, is represented by an isotactic diad index m of more than 0.75.

9. A film according to claim 8, which has a transparency such that the total light transmittance is at least 80%.

10. A stretch packaging film made of the film as defined in claim 8.

11. A stretch packaging film containing at least 5 wt % of an aromatic vinyl compound-ethylene random copolymer having an aromatic vinyl compound content of from 1 to 50% by molar fraction, having head-to-tail chain structures comprising at least two aromatic vinyl compound units, and comprising a structure represented by the following formula (2) as the main structure, whereby the index θ represented by the following formula (ii), is larger than 70:

$$\theta = A1/A2 \times 100 \qquad (ii)$$

where A1 is the sum of areas of peaks attributable to methine and methylene carbon α to ε in the following formula (2') as observed within a range of from 0 to 50 ppm by 13C-NMR using TMS as standard, and A2 is the sum of areas of peaks attributable to the main chain methylene and methine carbon, as observed within a range of from 0 to 50 ppm by 13C-NMR using TMS as standard:

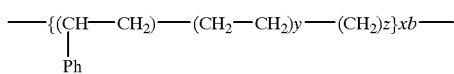

(2)

wherein Ph is an aromatic group xb is an integer of at least 2 representing the number of repeating units, y is an integer of at least 1, which may be the same or different among the respective repeating units, and z is 0 or 1, which may be the same or different in the respective repeating units,

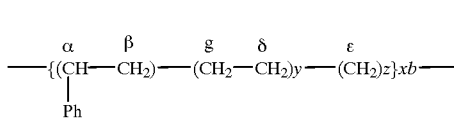

(2')

wherein Ph is an aromatic group xb is an integer of at least 2 representing the number of repeating units, y is an integer of at least 1, which may be the same or different in the respective repeating units, and z is 0 or 1, which may be the same or different in the respective repeating units.

12. The film according to claim 1, wherein the aromatic vinyl compound-α-olefin random copolymer is produced by polymerizing an aromatic vinyl compound and an α-olefin monomer by means of a transition metal compound represented by the formula (3) and a cocatalyst represented by the following formula (4-1) and/or (4-2):

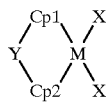

(3)

wherein each of Cp1 and Cp2 is an unsubstituted or substituted cyclopentadienyl group, an unsubstituted or substituted indenyl group, or an unsubstituted or substituted benzindenyl group, and Cp1 and Cp2 may be the same or different from each other, provided that at least one of Cp1 and Cp2 is an unsubstituted or substituted indenyl group, or an unsubstituted or substituted benzindenyl group, Y is carbon, silicon, germanium or boron, which has bonds to Cp1 and Cp2 and has other substitutents, the substituents being hydrogen, halogen, a $C_{1-15}$ alkyl-group, a $C_{6-14}$ aryl group or a $C_{7-40}$ alkylaryl group, wherein these substituents may be the same or different from one another, or may have a cyclic structure, X is hydrogen, halogen, an alkyl group, an aryl group, a silyl group, an alkoxy group or an amido group, and M is Zr, Hf or Ti,

(4-1)

wherein R is a $C_{1-5}$ alkyl group, a $C_{6-10}$ aryl group or hydrogen, and m is an integer of from 2 to 100, wherein the respective R may be the same or different from one another,

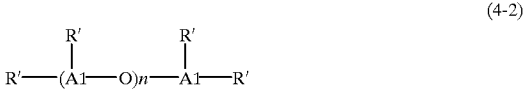

(4-2)

wherein R' is a $C_{1-5}$ alkyl group, a $C_{6-10}$ aryl group or hydrogen, and n is an integer of from 2 to 100, wherein the respective R' may be the same or different from one another.

13. The film according to claim 1, wherein the aromatic vinyl compound is styrene.

14. The film according to claim 6, wherein Ph is a phenyl group.

15. The film according to claim 7, wherein Ph is a phenyl group.

16. The film according to claim 11, wherein Ph is a phenyl group.

* * * * *

UNITED STATES PATENT AND TRADEMARK OFFICE
CERTIFICATE OF CORRECTION

PATENT NO. : 6,248,850 B1  
DATED : June 19, 2001  
INVENTOR(S) : Arai et al.

Page 1 of 1

It is certified that error appears in the above-identified patent and that said Letters Patent is hereby corrected as shown below:

<u>Title page,</u>  
Item [75], the inventors' information should read:

-- Item [75] Inventors: Toru Arai; Akihiko Nakamura; Shigeru Suzuki; Toshiaki Otsu; Akio Okamoto, all of Machida-shi (JP) -- .

Signed and Sealed this

First Day of January, 2002

Attest:

Attesting Officer

JAMES E. ROGAN  
*Director of the United States Patent and Trademark Office*